United States Patent
Knecht et al.

(10) Patent No.: US 6,570,949 B2
(45) Date of Patent: May 27, 2003

(54) METHOD AND APPARATUS FOR TESTING NUCLEAR REACTOR FUEL ASSEMBLIES

(75) Inventors: Klaus Knecht, Erlangen (DE); Richard Stark, Effeltrich (DE)

(73) Assignee: Framatome and GmbH, Erlangen (DE)

( * ) Notice: Subject to any disclaimer, the term of this patent is extended or adjusted under 35 U.S.C. 154(b) by 0 days.

(21) Appl. No.: 09/994,202

(22) Filed: Nov. 26, 2001

(65) Prior Publication Data

US 2002/0075984 A1 Jun. 20, 2002

Related U.S. Application Data

(63) Continuation of application No. PCT/EP00/04830, filed on May 26, 2000.

(30) Foreign Application Priority Data

May 26, 1999 (DE) .......................................... 199 24 066

(51) Int. Cl.[7] .............................................. G21C 17/00
(52) U.S. Cl. ...................... 376/253; 376/250; 376/251
(58) Field of Search ................................ 376/253, 272, 376/250, 251

(56) References Cited

U.S. PATENT DOCUMENTS

| | | | | |
|---|---|---|---|---|
| 4,318,777 A | 3/1982 | Sujumura et al. | ............ | 376/253 |
| 4,416,847 A | 11/1983 | Saito et al. | ................... | 376/253 |
| 5,544,208 A | 8/1996 | Pao et al. | .................... | 376/253 |

FOREIGN PATENT DOCUMENTS

| | | | | |
|---|---|---|---|---|
| DE | 1 130 084 | 5/1962 | ................. | 376/250 |
| DE | 2 228 766 | 12/1972 | ................. | 376/250 |
| DE | 25 43 502 A1 | 9/1976 | ................. | 376/250 |
| DE | 28 18 782 A1 | 11/1978 | ................. | 376/250 |
| DE | 29 42 055 A1 | 5/1980 | ................. | 376/250 |
| DE | 42 38 563 A1 | 5/1994 | ................. | 376/250 |
| DE | 195 42 330 A1 | 5/1996 | ................. | 376/250 |
| EP | 0 024 212 A1 | 2/1981 | ................. | 376/250 |
| GB | 1 376 060 | 12/1974 | ................. | 376/250 |
| JP | 58-82192 | 5/1983 | ................. | 376/250 |
| JP | 2-44292 A | 2/1990 | ................. | 376/250 |
| JP | 3-185399 A | 8/1991 | ................. | 376/250 |
| JP | 09 189 794 A | 7/1997 | ................. | 376/250 |

OTHER PUBLICATIONS

J. Krüger et al.: "Fortschrittliche In–Core–Sipping–Technik" [advanced in–core–sipping technology], Atomwirtschaft, Jul. 1989, pp. 352–354.

H. Knaab et al.: "Sipping equipment for leak testing of fuel assemblies in VVER–440 reactors", Kerntechnik, vol. 56, 1991, No. 2, pp. 94–97.

*Primary Examiner*—Charles T. Jordan
*Assistant Examiner*—Ricardo Palabrica
(74) *Attorney, Agent, or Firm*—Laurence A. Greenberg; Werner H. Stemer; Ralph E. Locher (57) ABSTRACT

A method for testing whether fuel rods of fuel assemblies resting on a working base and under water, of a nuclear reactor are leaking is disclosed. The method includes heating at least one first fuel assembly of a first division of fuel assemblies for driving radioactive fission products out of a defective fuel rod contained in the first fuel assembly. The first fuel assembly is continuously tested by extracting samples of water and continuously degassing the water removed from an area around the first fuel assembly even during the heating resulting in gas. A radioactivity of gaseous fission products released in the gas is continuously recorded. A fuel assembly belonging to a second division of fuel assemblies is heated only if the first fuel assembly belonging to the first division of fuel assemblies has been tested. An apparatus for implementing the method is also disclosed.

19 Claims, 5 Drawing Sheets

METHOD AND APPARATUS FOR TESTING NUCLEAR REACTOR FUEL ASSEMBLIES

CROSS-REFERENCE TO RELATED APPLICATION

This application is a continuation of copending International Application No. PCT/EP00/04830, filed May 26, 2000, which designated the United States.

BACKGROUND OF THE INVENTION

Field of the Invention

The invention relates to a method and an apparatus for testing a plurality of fuel assemblies of a nuclear reactor, in particular a boiling water reactor, for fuel rod leaks while the fuel assemblies are resting under water on a working base, in particular while they are still inside a core assembly in a reactor pressure vessel. The fuel rods are heated in order to drive radioactive fission products out of defective fuel rods, and the radioactivity of the fission products that have been driven out is recorded in samples that are extracted from the environment of the fuel assemblies. The corresponding apparatus includes a hood, the opening of which faces downward and can be positioned over at least one of the resting fuel assemblies. At least one extractor hood with an extraction device leads out of the hood, and there is a detector device for analyzing the radioactivity of the extracted fission products.

In nuclear reactors, spent fuel rods have to be replaced with new fuel rods at regular intervals, and the new fuel rods are then redistributed through the core together with reusable fuel assemblies. Generally, the old fuel assemblies are lifted out of their working base, i.e. for example a lower core grid in the reactor pressure vessel, and are initially placed on a different working base, for example a storage rack in a dedicated water basin, in order subsequently to be returned to the reactor pressure vessel and inserted at the new position in the reactor core. The fuel assemblies are under water throughout the entire operation for radiation protection reasons, and to be transported they are held in a height-adjustable manner on the mast of a displaceable fuel handling machine.

Light water-cooled reactors have to be shut down, and for cost reasons operating pauses of this nature should be kept as short as possible.

However, irradiated fuel assemblies can only be reused if the cladding tubes of the fuel rods do not have any leaks through which radioactive fission products formed in the fuel as a result of the nuclear fission during the prior reactor operation could escape and unacceptably contaminate the cooling water of the reactor. As well as visual inspections of the fuel assemblies and testing of individual fuel rods by ultrasound or eddy-current probes, what is known as "sipping" is a conventional method of identifying the fuel assembly which contain a fuel rod with a leak. First, a pressure difference is generated between the internal pressure in the fuel rod and the external pressure in the surrounding water, in order to drive out the fission products formed in the fuel rod filling in the maximum possible quantities and then to analyze samples extracted from the environment of the fuel assembly. Detectors for radioactive radiation can be used for the analysis. Detectors of this type may, for example, be particularly sensitive to gaseous fission products, such as xenon 133 or krypton 85, in gaseous samples or to water-soluble fission products (e.g. iodine 131 or cesium 134) in water samples.

When testing for leaks in irradiated fuel assemblies, reliability of detection and speed are particularly important criteria.

For this purpose, "mast sipping" has been developed, in which the search for leaks is carried out while the fuel assemblies are hanging from the mast of the handling machine and are being transported between the two above-mentioned working bases. In the case of pressurized water handling machines, a fuel assembly, in order to laterally protect its fuel rods, is lifted into a centering bell, which is then introduced into the hollow mast of the handling machine. Since the fuel assembly is lifted several meters, the hydrostatic pressure in the surrounding water falls with respect to the internal pressure in the fuel rods, pressure equalization taking place at the leaks in fuel rods, which causes the radioactive fission products to be driven out of the defective fuel rod. Dry sipping is then possible, in which the escaping gas bubbles collect at the top of the centering bell and are extracted together with a purge gas which is introduced into the centering bell from below, displaces the cooling water and also entrains gaseous fission products which have been adsorbed on the outer surface of the fuel rods. The extracted gas can be analyzed on-line in a detector device with an electronic evaluation device, i.e. the radioactivity of the gaseous fission products which have been driven out is recorded while the fuel assembly is still hanging from the handling mast. It is possible to dispense with the introduction and extraction of the purge gas, in which case only water is extracted from the top of the fuel assemblies until virtually all the cooling water which was originally present in the fuel assembly or the centering bell has been exchanged ("dry sipping"). During the exchange of the water, it is also possible for gas bubbles that originally escaped to be dissolved or at least entrained by the flow of water and to be released again together with dissolved fission products by degassing the extracted water in a degassing device, in order for their radioactivity subsequently to be recorded in a detector device.

In the boiling-water reactor, the mast of the handling machine is simply a telescopic arm with a downwardly projecting gripper on which the fuel assembly is held outside the mast. In this case too, the above-mentioned mast sipping methods are possible if the gripper is disposed in a downwardly open hood that has been fitted over the top fitting of the fuel assembly. This is because boiling water fuel assemblies have a fuel assembly channel that laterally surrounds the fuel rods and during the sipping is responsible for the function of the centering bell in the hollow mast of the handling machine. Depending on the size of the core, the mast sipping requires 50 to 120 hours. Although the fuel assembly should if possible be tested while the fuel assemblies are being transported, the mast sipping requires additional time.

Another conventional way of saving time in boiling water reactors is to test a plurality of fuel assemblies simultaneously by a hood that is divided by side walls into individual cells for accommodating the individual fuel assemblies. The simultaneous testing of the fuel assemblies may take place as dry sipping. Although this only leads to a slight hydraulic pressure difference between the at-rest position in the core and the position in which the sipping is carried out, the expulsion of the fission gases is increased by the fact that so much gas is introduced into the hood which has been fitted over the fuel-assembly top fittings that the upper edge of the fuel assembly channel of each top fitting is positioned in a gas cushion which virtually suppresses the circulation of cooling water on the fuel rods. Therefore, the afterheat of the fuel heats the internal volume of the fuel rods and thermally generates a pressure difference that sufficiently reinforces the hydraulic pressure difference. The gas bubbles that escape through leaks and bubble upward combine with the gas cushion beneath the hood. After a predetermined heating time, the gas cushion can be extracted together with the collected gaseous fission products in order to be analyzed, for example in a laboratory, for the presence of typical fission products.

This dry sipping can also be carried out without the fuel assemblies having to be lifted so far out of the reactor core that their lower end would be accessible for the introduction of purge gas or without the fuel assemblies having to be moved in the reactor core at all, i.e. while they are on their standard working base (the lower core grid in the reactor pressure vessel or a storage rack). Although this eliminates the time required to raise the fuel assembly, and in particular the time required to reliably pick up all the fuel assemblies which are to be tested simultaneously, it is necessary, and this takes virtually the same amount of time, to position the extractor hood in a precise position with respect to the working base. A time saving could result if a large number of fuel assemblies at the same time could be tested individually (i.e. by use of in each case a dedicated device for heating and extraction—i.e. requiring a considerable outlay on equipment) and the hood only had to be repositioned a few times. However, in the boiling water core there are in each case four fuel assemblies in a square mesh of the core grid, and the tight spatial conditions within a mesh in practice do not allow side walls, which could be used to form a dedicated gas cushion for collection of the rising fission gases at the top of each fuel assembly, still to be introduced between the fuel assembly channels thereof. A further difficulty is that the fuel assemblies generally undergo different growth and distortion as a result of the reactor radiation, but the upper edge of the fuel assembly channel has to reach the gas cushion if fission products from a fuel assembly are not to enter the gas cushion of another fuel assembly, which would invalidate the test.

Therefore, dry sipping, in which the fuel assemblies rest on their working base, would at most be suitable as a preliminary test in which in each case the four fuel assemblies belonging to a core grid mesh are together tested for leaks from all the fuel rods. The fission gases escaping from one of the four fuel assemblies are diluted in the common gas cushion and the long extraction lines in such a manner that long measurement times, e.g. in an analysis laboratory for removed gas samples, are required. If this results in a significant increase in the radioactivity over the environment, it would then be necessary for the leak-tightness of each fuel assembly of this mesh subsequently to be tested individually in some other way.

In a process in which the fuel assemblies rest on the working base, one obstacle to the idea of extracting water samples from the fuel assemblies after the heating and then degassing them rather than gas samples from a gas cushion (i.e. instead of dry sipping), is that during the heating gaseous fission gases escape into the gas cushion and are therefore lost to analysis of the gases dissolved in the extracted water. However, it is possible to detect the solid or liquid fission products that are released into the water. For this purpose, water samples that have been removed individually from the fuel assemblies can be tested in a laboratory (off-line). In this way, all the fuel assemblies of a core can be tested within 30 to 50 hours.

To increase the measuring rates for a radioactive gas that is only produced in small quantities, the small quantities are often mixed with a non-radioactive carrier gas and are passed through a configuration of detectors a number of times in a circuit. As a result, the radioactivity is recorded a number of times, in order to acquire a statistically significant deviation from the normal radioactivity of the environment. A statistical significance of this type is particularly important when detecting fission products from defective fuel rods if the fuel assemblies with the fuel rods have already been tested in the water basin of a nuclear reactor, since in that case there is already a relatively high background of radioactivity.

SUMMARY OF THE INVENTION

It is accordingly an object of the invention to provide a method and an apparatus for testing nuclear reactor fuel assemblies that overcomes the above-mentioned disadvantages of the prior art methods and devices of this general type, in which the leak testing of the fuel rods of individual fuel assemblies is completed within the shortest possible time and using processes which are as simple as possible. It has been developed in particular for boiling water reactors and is described for such reactors, although it can also be applied to other fuel assemblies surrounded by fuel assembly channels or fuel assemblies (e.g. of pressurized water reactors) if they are in an insulating container which prevents the coolant in the fuel assembly from escaping at the sides.

With the foregoing and other objects in view there is provided, in accordance with the invention, a method for testing whether fuel rods of fuel assemblies resting on a working base and under water, of a nuclear reactor are leaking. The method includes heating at least one first fuel assembly of a first division of fuel assemblies for driving radioactive fission products out of a defective fuel rod contained in the first fuel assembly. The first fuel assembly is continuously tested by extracting samples of water and continuously degassing the water removed from an area around the first fuel assembly even during the heating resulting in gas. A radioactivity of gaseous fission products released in the gas is continuously recorded. A fuel assembly belonging to a second division of fuel assemblies is heated only if the first fuel assembly belonging to the first division of fuel assemblies has been tested.

To achieve this, the invention makes use of the method in which the fuel assemblies rest on the working base and under water while their fuel rods are being tested for leaks. The fuel assemblies are heated in order for the radioactive fission products to be driven out of defective fuel rods, and the testing is carried out by recording the radioactivity of fission products which have been driven out in samples which have been extracted from the environment of the fuel assemblies. In the most simple embodiment of the invention, the fuel assemblies are tested in succession, in which case a fuel assembly is heated, and the water is continuously extracted from the fuel assembly as a sample even as early as during the heating and is continuously degassed. This leads to gas being continuously liberated as a result of the radioactivity of the gaseous fission products that have been liberated being continuously recorded. The method is controlled online, i.e. the measurement results are produced continuously even during the continuous extraction, and then the end of the test can also be established from these results, so that the testing of another fuel assembly can then be commenced.

At any rate, the fuel assemblies are located in water in which the gaseous fission products, which may have been in the water even before the heating and may originate from other fuel. assemblies, may also be dissolved. A radioactive "background" of this nature may interfere with the meaningfulness of the measurements, since in this case not only are the fission products which have been driven out of the fuel assemblies during the heating recorded from the extracted water, but also fission products from this "background" may be released during the degassing. According to the invention, it is advantageous if a carrier gas which if possible has no radioactivity or the radioactivity of which is virtually constant at least for all the fuel assemblies which are to be tested in succession (i.e. for example sucked-in ambient air or nitrogen or another gas which is held in compressed form in cylinders), is passed through the extracted water. In the water, the carrier gas forms bubbles that also take up the residual quantities of dissolved fission products that are not released simply by reducing the pressure or similar degassing measures. The water is then virtually completely degassed.

The radioactivity of the gases released can be recorded in a detector or in a configuration of a plurality of detectors connected in series, but it is advantageous for the fission products which have been released not to be passed through the detector device a number of times in a circuit. Although multiple detection of this nature increases the counting rates, it erroneously introduces a higher significance, since not only the fission products that have been driven out of the defective fuel rods but also the fission products of the background are recorded a number of times. It is then difficult to assess whether only released fission products from the background are being counted over and over again in the circuit, and the counting rates are increasing, or whether the rise is attributable to an increasing escape of fission products from heated, defective fuel rods. Rather, it is advantageous for the gas formed during the degassing of the water only to be passed through the detector device once and then to be passed into an exhaust duct or disposed of in some other way.

First, a particularly preferred embodiment of the invention will be explained in general terms but with reference to a specific example. In this case, the fuel assemblies of the core are divided into groups and divisions; the text in brackets in each case relates to the specific example in order to facilitate understanding.

The embodiment takes into account the fact that the fuel assemblies are located in meshes of the core grid that—apart from individual meshes at the edge—contains four fuel assemblies in each mesh. The regular arrangement allows the fuel assemblies to be divided into clear groups, e.g. a first group of fuel assemblies, a second group and, if appropriate further groups, which each contain a first fuel assembly a second fuel assembly and, if appropriate further fuel assemblies. The fuel assemblies belonging to a first division that contains at least the first and second groups should be fully tested for leaks from their fuel rods before a first fuel assembly belonging to another division is tested.

Therefore, at least "first" fuel assemblies and "second" fuel assemblies belong to the first division. According to this embodiment, the fuel assemblies belonging to the first group are heated together and are subjected to a common preliminary test by in each case one device for extraction, degassing and recording of the radioactivity, i.e. all the fuel assemblies belonging to the first group are tested together for leaks in the preliminary test, using the principle mentioned in the introduction, with the fuel assemblies remaining on the working base and continuous extraction of water, degassing and recording of the radioactivity taking place even during the heating. Although water is extracted, fission gases are therefore recorded and the testing takes place on-line, i.e. the first measured values for the radioactivity are already present and are being evaluated while extraction and degassing are still ongoing.

If the radioactivity in the gas which is liberated as a result of water being extracted from all the fuel assemblies belonging to the first group practically does not rise from the original measured level before the beginning of the test or the environmental level, the testing of the group is ended. Only in the case of a group which reveals significant radioactivity during the preliminary test are the fuel assemblies belonging to the group tested individually—but advantageously simultaneously—in which case a device for extraction, degassing and recording of the radioactivity is, of course, required for each fuel assembly belonging to the group (if the second group reveals significant radioactivity, therefore, in each case four devices for extraction, degassing and detection are used—for example simultaneously—to individually test the fuel assemblies). Since the final testing of a significant group therefore requires a plurality of (four) devices of this type, devices provided for this purpose are also used for preliminary testing, preferably for the simultaneous preliminary testing of a plurality of groups (in the example, it is therefore possible for the first and second groups and two further groups belonging to the first division to be tested simultaneously).

However, a single group may also be left at the edge, and in a modification to the method this group is then considered to be its own division, and there may also be groups that have fewer fuel assemblies than the other groups (e.g. only a first fuel assembly). However, the invention allows even incomplete divisions and/or groups of this type to be tested using the same equipment.

In the most simple case, the fuel assemblies are heated in the manner described in the introduction, using the afterheat of the fuel assemblies. For this purpose, at least the fuel assemblies belonging to the first group—and advantageously also all the other fuel assemblies belonging to the first division—are held under a common hood, in which, as a result of the introduction of gas, a gas cushion is generated above the fuel rods. The hood is only lifted off the fuel assemblies when the fuel assemblies have been tested.

Advantageously, the common hood is divided into cells above the fuel assemblies by side walls. In the most simple case, the way in which the hood is split into cells corresponds to the splitting of the division into groups.

To generate the gas cushion in each cell, it is preferable for gas to be passed into the cells until filling-level test lines that lead out of the cells indicate a predetermined height of the water level. Since not all the fuel assemblies are of the same height (for example because they originate from different manufacturers or because they have undergone different radiation-induced growth in the preceding operating cycles), but in the interests of sealing the fuel assemblies with respect to one another the fuel assembly channels are to extend all the way to the gas cushion as far as possible, the filling-level test lines in the individual cells can preferably be individually adjusted in terms of height in accordance with the height of the water level which has been predetermined for each cell. In this case, the filling-level test lines can be used simultaneously for venting, i.e. gas is introduced until gas escapes via the filling-level test lines. With the foregoing and other objects in view there is provided, in accordance with the invention, an apparatus for testing fuel assemblies resting on a working base and under water, of a nuclear reactor. The apparatus contains a hood that can be positioned above at least one first fuel assembly and having a downwardly facing opening. The downwardly facing opening can be fitted over a top fitting of at least the first fuel assembly. A first device is connected to and introduces a gas into the hood. A second device is provided for continuously extracting water positioned under the gas introduced into the hood. A third device is connected to the second device and receives the water previously extracted, the third device continuously degasses the water resulting in a released gas. A fourth device is connected to the third device and receives the released gas for continuously recording a radioactivity of the released gas. A control device is connected to the second, third and fourth devices. The control device runs a program for controlling the second, third and fourth devices.

Accordingly, the device includes a hood which can be positioned at least over a first fuel assembly and a downwardly facing opening of which can be fitted over the top fitting of at least the one fuel assembly, and a device for introducing gas into the hood, and also devices for extracting a sample and for recording (detecting) the radioactivity of a gas. The device for extraction of a sample is suitable and intended for the continuous extraction of water under the gas that can be introduced into the hood. It is connected, by a device for the continuous degassing of water, to a following device for detecting the radioactivity of a gas, which can be continuously supplied with the gas released in the degassing device and is able to measure the radioactivity of gases continuously. Moreover, there is a control device for controlling the devices for extraction, degassing and recording of the radioactivity.

The device for recording the radioactivity of the gas is advantageously disposed in a disposal line that is connected to the degassing device. The gas that is produced continuously in the degassing device is continuously removed from the degassing device and then disposed of via the disposal line. Therefore, at least during the continuous extraction of the water, the degassing device and the device for recording the radioactivity of the gas are connected to one another only via the disposal line. This does not rule out the possibility of the degassing device and the device for recording radioactivity, before the fuel assembly is tested, being jointly connected to a venting and purging installation, but at least one suitable sequence control ensures that during the extraction of the water it is impossible for any extracted gas to be returned from the device for recording radioactivity to the degassing device. The above-mentioned venting and purging device is also advantageous for introducing a carrier gas into the extracted water in the degassing device, the carrier gas then providing gas bubbles and collection points for dissolved gaseous fission products in this extracted water. Any gaseous fission products that are driven out of the defective fuel rods are also degassed and, together with the carrier gas, are carried into the device for recording radioactivity, where they lead to an increase that at a very early stage makes it possible to reach a judgement about the state of the fuel rods.

Therefore, the apparatus, in a method according to the invention, in which, in a first division of fuel assemblies, which contains at least one first fuel assembly or a plurality of first fuel assemblies, at least one first fuel assembly is heated and in this way is tested, allows water to be continuously extracted as a sample even during the heating. The water is continuously degassed, and in the gas that is liberated the radioactivity of gaseous fission products released is continuously recorded. The heating and testing of a first fuel assembly belonging to a second division of fuel assemblies—in particular the fitting of a hood—is only commenced when the first fuel assembly belonging to the first division has been tested. Advantageously, at least the first fuel assembly belonging to the first division is heated under a hood which has been fitted over a plurality or all of the fuel assemblies belonging to the first division and which contains a gas fill which surrounds the top fitting of the first fuel assembly(s) to be heated.

This avoids movement of the fuel assemblies; the number of time-consuming hood movements can be minimized, and it is possible to check for leaks from all the fuel assemblies belonging to one division in a common heating and preliminary testing step, which only has to be followed by the same number of individual testing steps on the fuel assemblies as the number of groups which are identified as significant. In the case of divisions containing at most four groups for in each case four fuel assemblies, in the least favorable situation, which scarcely ever occurs (i.e. that each of the four groups contains defective fuel rods), only five method steps are required.

This is possible because during the heating the fission products are driven out of the vicinity of a leak in a rod, and therefore the fission gases begin to escape as early as during the heating, but even in the fifth step fission gases are still being produced continuously from more remote locations in the fuel rod and in particular from pores which are close to the surface in the fuel rod. Although the surface temperature of the fuel rods asymptotically approaches a maximum temperature (e.g. 25° to 40° K. above the temperature of the reactor water, according to the, irradiation state and the afterheat of the fuel), the quantity of fission gas which constantly escapes and collects in the water of the fuel assembly is sufficient to unambiguously identify defective fuel assemblies even in the final step.

The on-line evaluation enables the test to be interrupted as soon as significant results are obtained. As a result, the time required to test a complete core, which has hitherto. generally been from 30 to 120 hours, is shortened to less than 15 hours.

A predetermined temperature difference (e.g. 10° K. or less if significant measured values are already present) is sufficient for heating. Temperature monitoring is not required. For example, a fuel assembly can generally be considered intact and the test can be ended if the measurement results produced online reveal no increase in the radioactivity after a period of time which corresponds, for example, to heating by 10° K. Only a very considerable scatter of measured values may make it necessary to wait for longer times to determine whether the radioactivity rises above the basic level by a predetermined minimum value. A reliable judgement in this respect can be reached at the latest after a heating time for which a value of between 10 and 25° can be predetermined.

The measurement results can be evaluated intellectually or automatically. In particular, the heating and testing may be controlled automatically by a testing program that is started as soon as the hood has been positioned on the fuel assemblies and, for example, delivery pumps and valves are connected into the devices for extraction and detection.

Gas is preferably introduced under the hood until a filling-level test line that leads out of the hood indicates a predetermined height of the water level beneath the hood. In general, it is advantageous if the upper edge of the fuel assembly channel extends as far as the water level beneath the hood, since the interior of the fuel assembly channel is then insulated from extraction lines in other fuel assemblies. Therefore, fission product emerging from a defective fuel rod in one fuel assembly cannot enter an adjacent fuel assembly and invalidate the results for that assembly. The extraction of the water takes place as far as possible above the end plugs of the fuel rods (advantageously above the upper rod-holding plate in the top fitting of each fuel assembly), in order also to capture fission products that could escape at that location from leaking weld seams. This requires the positioning of the extraction lines and the water level beneath the gas cushion to take account of the individual length of the fuel assemblies.

The hood is preferably only fitted over at least one fuel assembly belonging to a different division, and the fuel assembly belonging to the other division is only inspected, when a check has been carried out for leaks from all the fuel assemblies belonging to the first division.

As has already been mentioned, the edge of the core grid can no longer be divided into grid meshes that form a complete group (four fuel assemblies). However, the apparatus and the method according to the invention can also be applied to these cases. In this case, therefore, the fuel assemblies belonging to one division, which in addition to a first or a plurality of first fuel assemblies also contains a second fuel assembly or a plurality of second fuel assemblies, are heated and tested. For this purpose, at least the fuel assemblies belonging to a first group, which includes at least one first fuel assembly and at least one second fuel assembly belonging to the first division, are heated together in a first step, and the fuel assemblies belonging to the first group are subjected to a common preliminary test, in which, during the heating, water is continuously extracted from each fuel assembly and is continuously degassed in a common degassing device. Moreover, by recording the radioactivity of the gaseous fission products contained in the gas that is released in the process, all the fuel assemblies belonging to the first group together are checked for leaks. Only in the event of significant radioactivity are, in a second step, the fuel assemblies belonging to the first group tested individually by independent, continuous extraction of water, independent degassing and independent recording of the radioactivity.

In the process, preferably the fuel assemblies which have been subjected to a common preliminary test in the first step are, in the second step, tested simultaneously, i.e. at the same time, but independently—therefore by in each case a dedicated extraction device, degassing device and detector device for each fuel assembly belonging to the group exhibiting the significant radioactivity.

Preferably, the cells or groups each contain the same number of fuel assemblies (i.e. four in the present example) and the number of devices for extraction is likewise equal to this number, in which case at least some of the extraction devices can be switched from the extraction lines of individual fuel assemblies belonging to one group to the extraction lines of individual fuel assemblies belonging to another group and to the combination of extraction lines belonging to a group. This enables extraction devices with the degassing and detector devices connected to them to be used a number of times, namely first to subject a plurality of groups to the preliminary test simultaneously and then to simultaneously subject the individual fuel assemblies belonging to a group which exhibits a significant radioactivity to the final test.

The result is that, in the conventional boiling water rector cores with a square pattern for the configuration of the fuel assemblies, it is particularly advantageous if the number of groups in the division is equal to the number of individual fuel assemblies in a group, i.e. if four groups each containing four fuel assemblies form a division which is tested beneath the hood.

In the context of the present invention, reactors whose fuel assemblies are hexagonal in cross section are treated in the same way as boiling water reactors, provided that they are surrounded by a channel (as is the case with some light water reactors constructed in Eastern Europe). In this case, it is advantageous for the divisions to be formed from two groups each containing three fuel assemblies or from three groups each containing two fuel assemblies. In this case and for the divisions and groups which occur at the periphery of the reactor core, in which it is impossible to fit every fuel assembly position beneath the hood, it is not possible to use all the devices which are present in every step, but rather some of them are shut down. It is also advantageously possible for extraction lines or filling-level lines at unoccupied positions of the hood at the core periphery to be blocked off.

Other features which are considered as characteristic for the invention are set forth in the appended claims.

Although the invention is illustrated and described herein as embodied in a method and an apparatus for testing nuclear reactor fuel assemblies, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
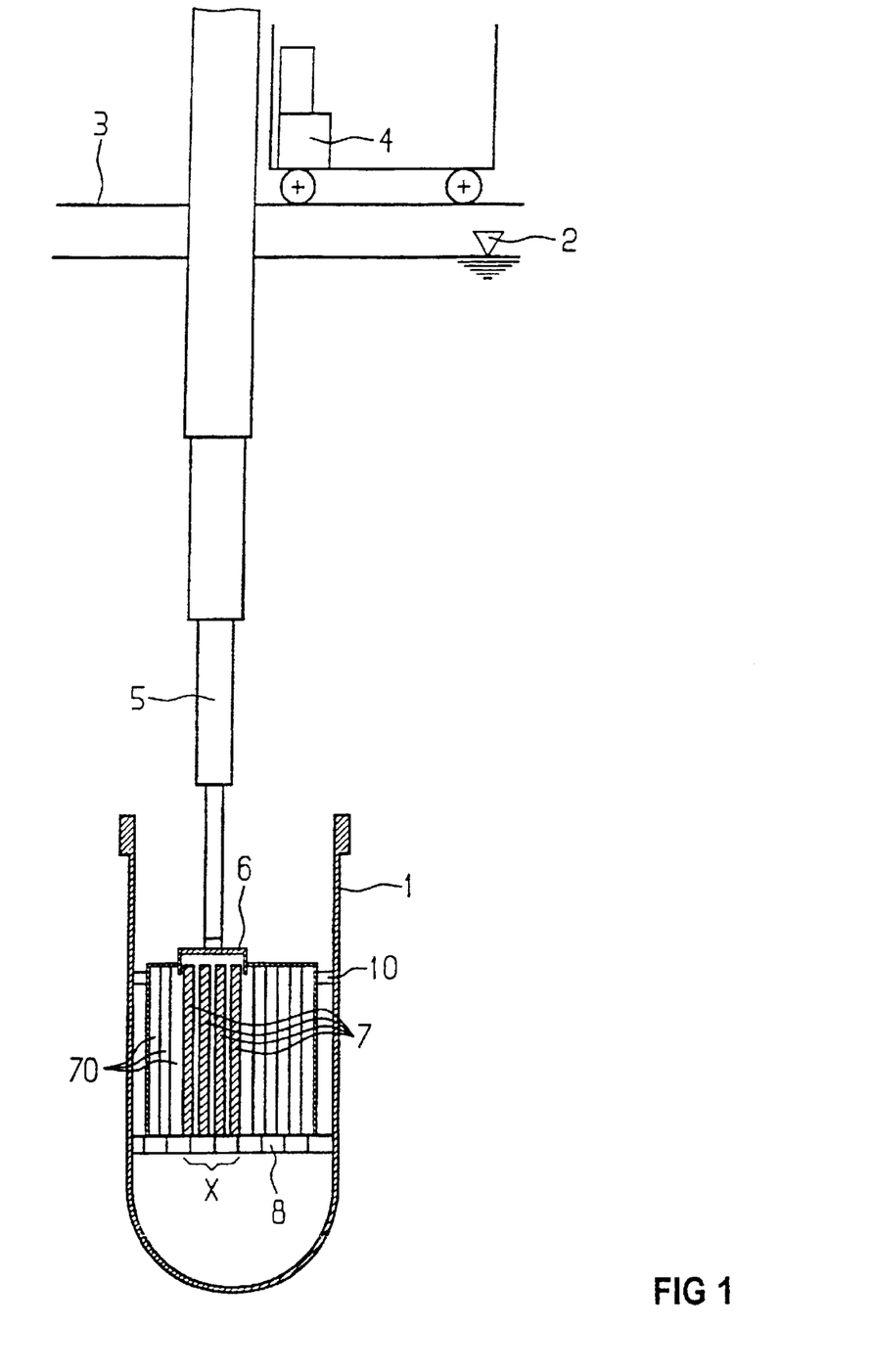
FIG. 1 is a diagrammatic, illustration of a reactor pressure vessel with a reactor core, and a fuel handling machine having an apparatus according to the invention.

Referring now to the figures of the drawing in detail and first, particularly, to FIG. 1 thereof, there is shown a reactor pressure vessel 1 situated beneath a surface 2 of cooling water in a boiling water reactor, while a handling machine 4 can be displaced over the surface 2 on a bridge or ramp 3. The handling machine 4 bears a mast 5 in the form of a telescopic arm, and on end of the mast 5 a hood 6 is disposed.

In the reactor pressure vessel 1, fuel assemblies 7, 70 of the reactor are positioned on a lower fuel assembly grid 8. The hood 6, in a working position of the mast 5, being fitted over top fittings of the fuel assemblies 7 belonging to one division X, while the other fuel assemblies 70, belonging to a second division and other divisions, are divided.

Figure 2:
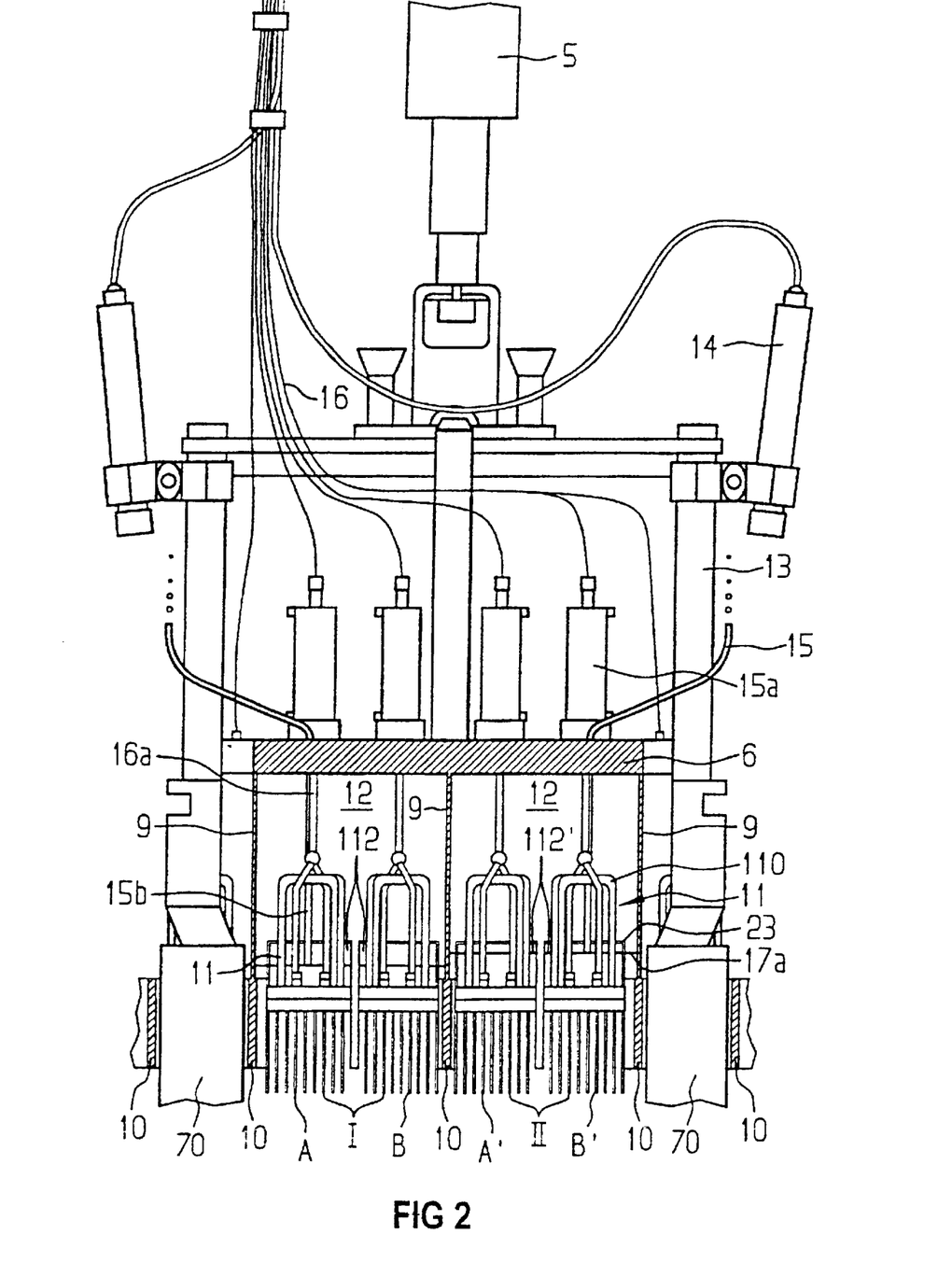
FIG. 2 is a side-elevational view of top ends of fuel assemblies in two meshes of a core grid, as well as a part of the apparatus according to the invention that is disposed under water.

In accordance with FIG. 2, the hood 6 is divided by side walls 9 into individual cells 12, the side walls 9 resting on bars 10 of an upper core grid. Each mesh of the core grid contains a group of in each case four fuel assemblies, the hood 6 being divided by the side walls 9 into four cells, under each of which there is a group of fuel assemblies belonging to the division X. In FIG. 2, in each case only the first fuel assemblies A, A' and the second fuel assemblies B, B' of the division X, which belong to a first group I and a second group II, are shown. The other two fuel assemblies C, D of the first group I and the fuel assemblies C', D' of the group II, as well as the remaining groups III and IV belonging to the division X, cannot be seen in FIG. 2.

The hood 6 is disposed in a frame 13 that is positioned on the top fittings of the fuel assemblies 70 that are spatially adjacent to the division X. The frame 13 bears video cameras 14 that are directed toward an outlet end of filling-level test lines 15. The filling-level test lines 15 are initially configured as flexible hoses leading to a connection on a height-adjustment device 15a, vent tubes 15b being connected to the connections. The vent tubes 15b are attached to suction tubes 16a, which branch in the form of a two-pronged fork and form an end of flexible extraction lines 16 which are guided out of the water as a bundle. For reasons of clarity, the filling-level test lines 15a are only shown for the fuel assemblies A and B' in FIG. 2, but it should be noted that corresponding vent tubes are also disposed on the suction tubes which lead into all the other fuel assemblies.

The vent tubes 15b and the suction tubes 16a are jointly lowered by the height-adjustment devices 15a until they are positioned precisely on the top fitting of the corresponding fuel assembly. The positioning may be effected, for example, as a result of the branching point of the fork-shaped suction tubes 16a resting on a bow 110 of a fuel-assembly top fitting 11 or the ends of the suction tubes 16a resting on upper rod-holding plate 112 of the corresponding fuel assembly.

If gas is then pumped into the cells 12 (e.g. via the extraction line 16) beneath the hood 6, a water level 17a falls in the cells 12 until it reaches a lower opening of the vent tubes 15b. The vent tube 15b of a cell whose end is highest determines the water level 17a beneath the gas cushion formed in the cell 12, since further gas then escapes through the corresponding vent tube 15b, generating gas bubbles at the other end of the vent tubes 15b, onto which the television camera 14 is directed. Adjustment of the vent tubes 15b and the extraction tubes 16, which are attached to one another, ensures that the extraction tubes always extract water below the water level that has been set in this way. Furthermore, an edge 23 of the fuel assembly channel of each fuel assembly generally projects a relatively long way above its upper rod-holding plate 112. It is therefore generally possible, by adjusting the position of the extraction tubes 16 and the vent tubes 15b with respect to one another, to ensure that even in the case of fuel assemblies which (on account of different production dimensions or different radiation-induced growth) do not all end at the same level, the fuel assembly channels of one group always project slightly above the water level 17a below the gas cushion of the corresponding cell. Fission products that enter the water of a fuel assembly therefore cannot pass through the water to the extraction tube 16 of the other fuel assembly. Therefore, they are also unable to pass into the gas cushion, which is common to a plurality of fuel assemblies, since the water of the fuel assembly is extracted while the pressure difference is still being built up-during heating, and therefore the fission products are initially driven gradually out of a defective fuel rod.

Figure 3:
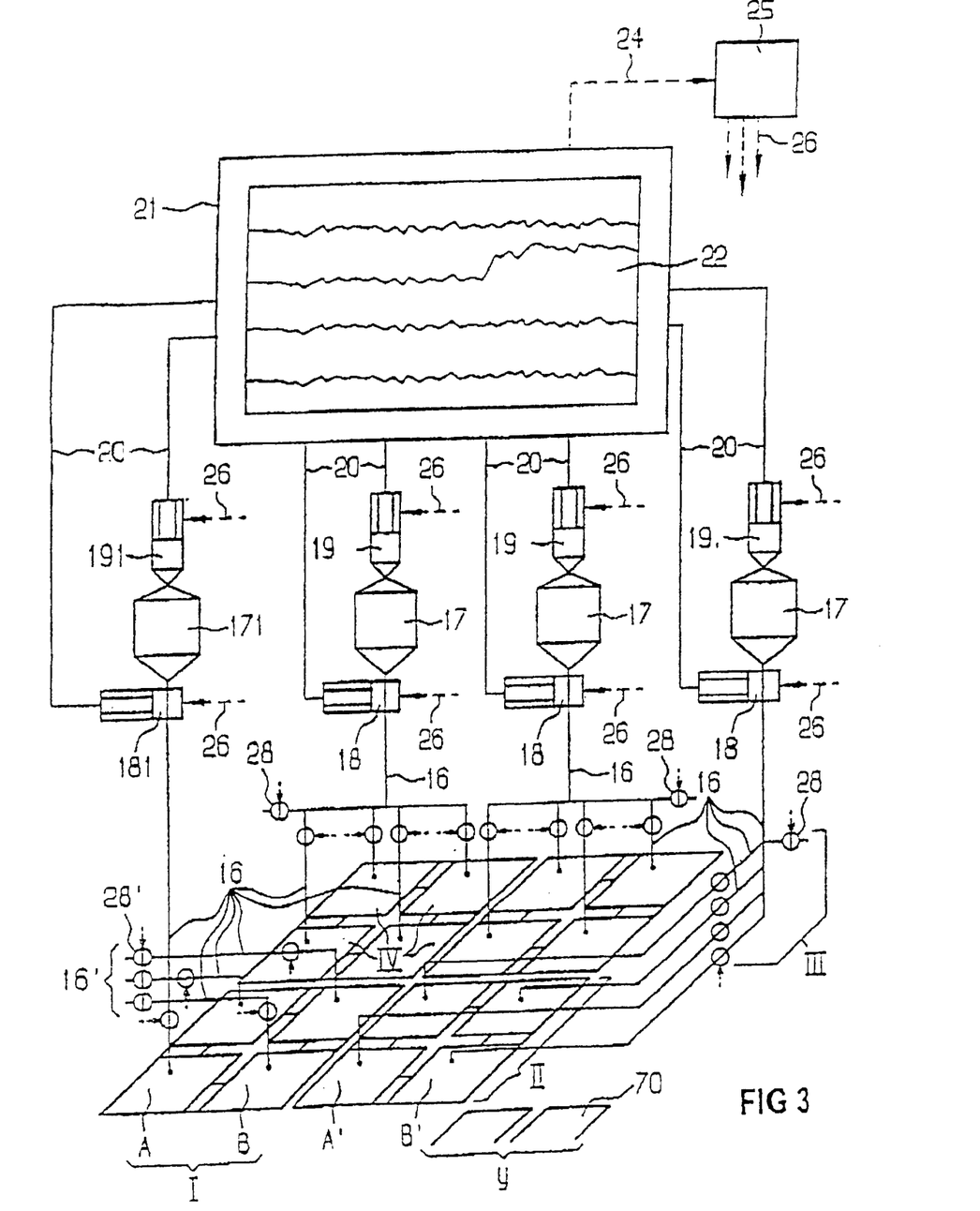
FIG. 3 is an illustration of part of the apparatus that is disposed above the water and the diagrammatic configuration during preliminary testing of a division of the fuel assemblies.

FIG. 3 illustrates the first fuel assemblies A, A' and the second fuel assemblies B, B' belonging to groups I and II, which have already been shown in FIG. 2, and also the two remaining fuel assemblies belonging to the groups and the corresponding fuel assemblies belonging to two further groups III, IV of the first division X. Furthermore, there are the further fuel assemblies 70 which belong to another, second division Y. Otherwise, FIG. 3 shows only those components of the apparatus according to the invention that project above the water level of the reactor well. These include four degassing devices 17, which are connected to the extraction lines 16 via a corresponding extraction device 18. The gases that are released in the degassing devices 17 are each removed from an assembly 19 which includes a gas-delivery device and a detector device which is configured to record radioactivity in gases. The measurement signals from the detector devices are fed via line channels 20 to an electronic appliance 21 which evaluates the measured values, displays them on a screen 22 in the form of measurement curves and inputs them to a programmed control unit 25 via an output line 24. Control lines 26 lead from the control unit 25 and are used to control the extraction devices 18 and the delivery devices, by which the removal of the gases released in the degassing devices 17 and the recording of the radioactivity of these gases in the assemblies 19 are controlled.

FIG. 3 shows the configuration that is activated during the preliminary testing in groups of the fuel assemblies in the first division X. FIG. 3 indicates that the extraction lines 16 of each extraction device 18 branch a number of times, with a shut-off valve 28, 28', which is likewise actuated by the control lines 26 of the control device 25, being located in each branch.

It can be seen from FIG. 3 that the water from the first fuel assembly A belonging to group I together with the water from the second fuel assembly B and the further fuel assemblies belonging to group I is fed via the extraction lines 16 to one of the four extraction devices 18, namely a device 181, connected to a degassing device 171 and an assembly 191 (detector device), the shut-off valves 28 in these lines being set to pass (i.e. being open). FIG. 3 also shows that the same extraction device 18 which is connected to the first fuel assembly A belonging to group I is also connected to three further extraction lines 16', the shut-off valves 28' of which are in a blocking position. The extraction lines 16' are provided in order, in the configuration shown in FIG. 4, to switch the corresponding extraction device in each case to a first fuel assembly belonging to one of the other groups II, III and IV as desired.

This is because if neither the detector device of the assembly 191 nor any of the other detector devices on any of the channels reveals any significant increase in the radioactivity, the testing of all the fuel assemblies belonging to the first group I has ended. Then, the extraction hood 6 is raised by the handling machine, all the shut-off valves are opened by the control device 25 and all the lines are purged with pool water via the extraction devices 18. The extraction hood 6 can then be positioned at a new position above a further division of fuel assemblies, and the testing of the fuel assemblies belonging to a new division is commenced by purging the degassing devices 17 with fresh air via the extraction devices 18 and initially delivering fresh air beneath the hood 6 which has been fixed at the new position via the extraction lines 16.

Figure 4:
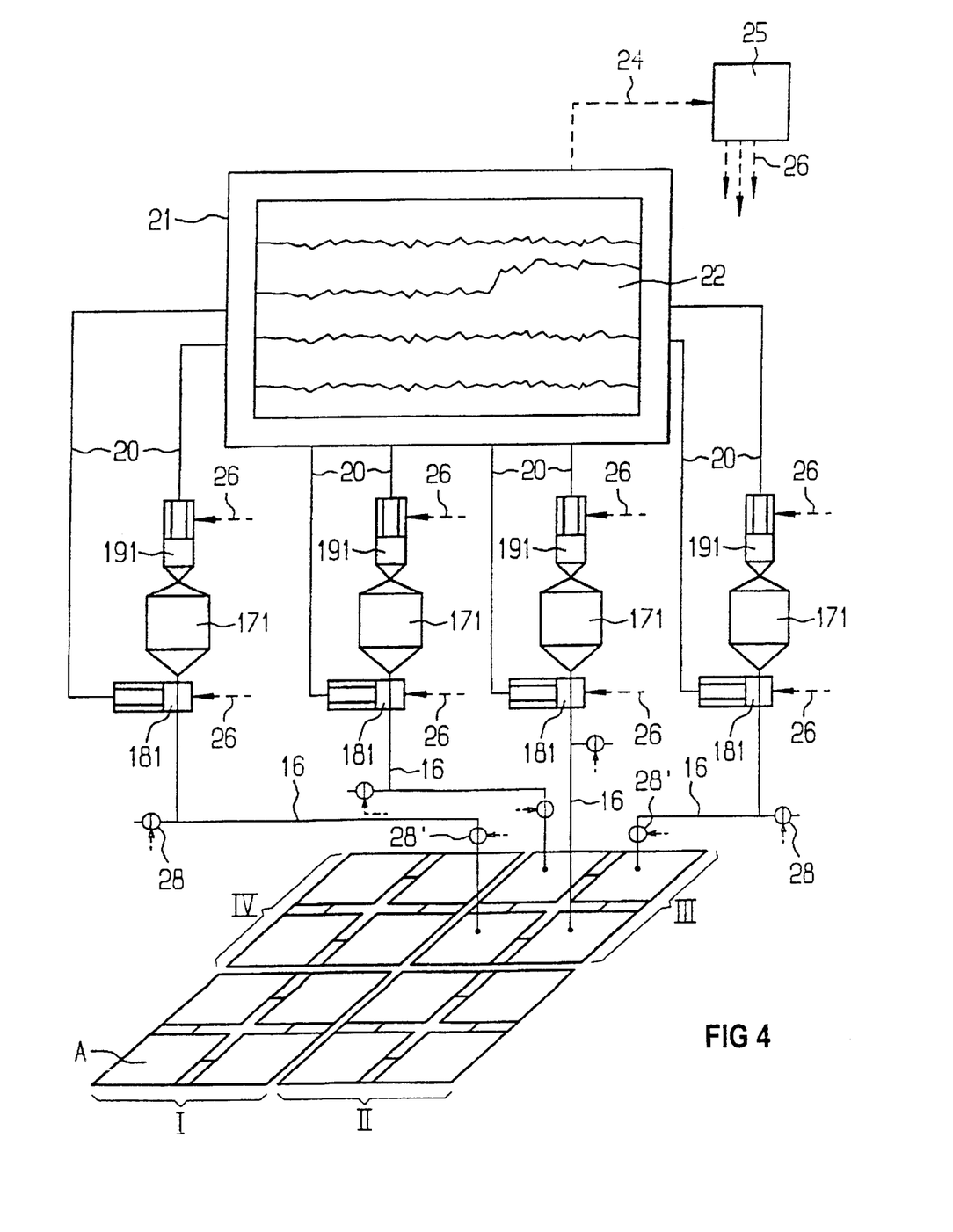
FIG. 4 is an illustration of the unchanged configuration for final testing of a group of fuel assemblies with significant radioactivity.

However, if a measurement channel, for example for group III, records a significant increase in the radioactivity, there is a leak in a fuel assembly in group III associated with the channel, and the leak has to be identified. For this purpose, as shown in FIG. 4, the devices which have already been used during the preliminary test are now assigned to the fuel assemblies in a different way by their shut-off valves 28 and 28'.

For example, the extraction device 181, which in FIG. 3 was connected to the further fuel assemblies belonging to the first group I, is switched over so that it is only connected to the first fuel assembly belonging to group III which has the significant radioactivity, and likewise in each case one of the further extraction devices is switched over to in each case one fuel assembly belonging to the significant group III. In this way, each individual fuel assembly can be individually tested by extraction, degassing and detection, the corresponding measurement curve in the display 22 now allowing the defective fuel assembly to be identified. The extraction devices are assigned to the individual fuel assemblies in a program-controlled manner via the control device 25 through actuation of the shut-off valves 28.

Figure 5:
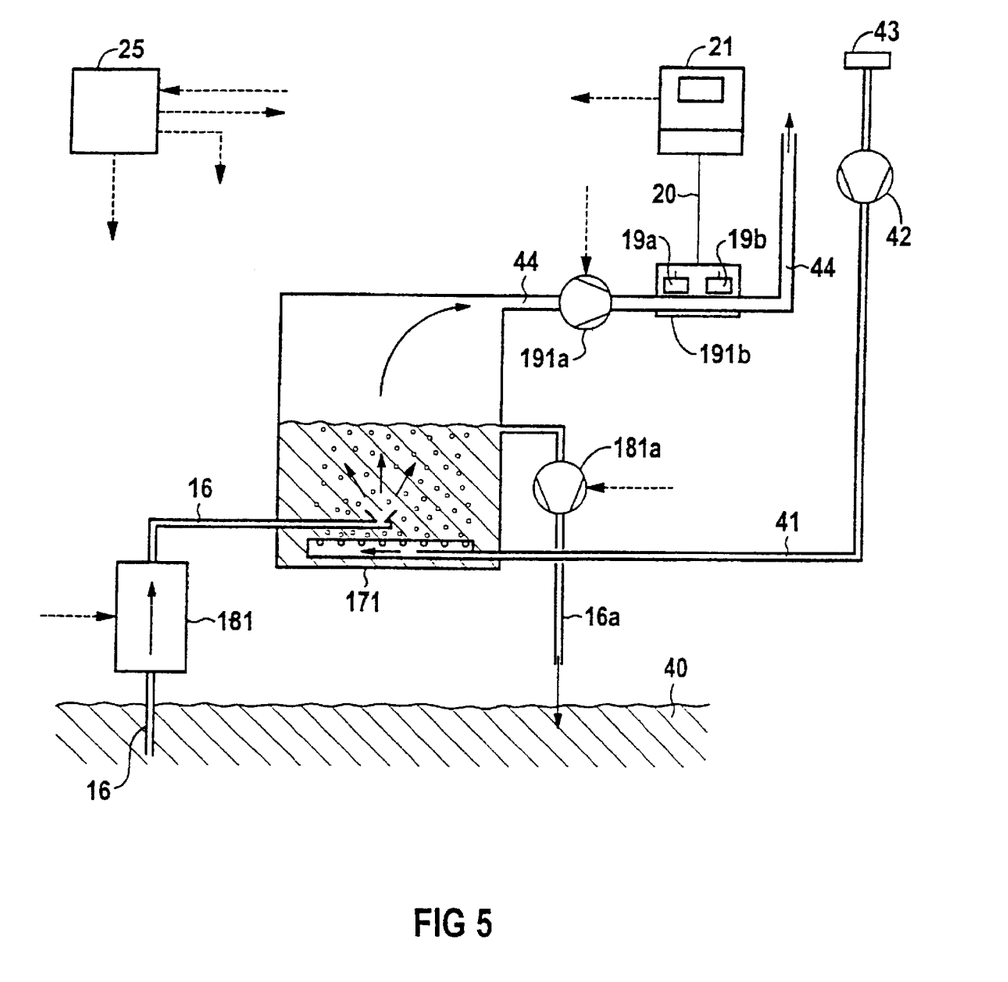
FIG. 5 is an illustration of a degassing device having a disposal line which contains a detector device.

FIG. 5 shows a water circuit above the level of water 40 in which the fuel assemblies to be tested are positioned. A water circuit feeds the water 40, which has been sucked out beneath one or more hoods 6 in accordance with FIGS. 3 and 4, and returns the water 40 via the overflow line 16a after the degassing, to a collection vessel of the degassing device 171 via the extraction line 16 and an extraction pump 181. A line 41 that is used to suck in ambient air, for example via a pump 42 and an air filter 43, opens into the collection vessel of the degassing device 171. However, a throttle valve can also be used to introduce nitrogen or any other non-radioactive gas out of a pressure vessel into the collection vessel of the degassing device 171. The carrier gas bubbles through the collected water in the collection vessel of the degassing device 171 and collects all the gases that are dissolved and released in the extracted water. In this example, the release of the gases is facilitated by a pump 191a that, together with a corresponding outlet pump 181a, generates a vacuum in the collection vessel. The pumps, compressors and similar delivery devices 181, 181*a*, 191*a* and 42 illustrated here are controlled synchronously with an evaluation device 21 of a detector device 191*b* by the control device and are in this case only symbolically illustrated for corresponding devices which the person skilled in the art will provide at any time in order to ensure that, during the testing of a fuel assembly, suitable pressure conditions for extracting the water from the fuel assembly and for transferring the fission products which are released and are mixed with the carrier gas are ensured in the collection vessel 171.

In the situation illustrated, the detector device 191*b* contains a β counter 19*a* and a γ counter 19*b*, the sensitivity spectrum of which is specifically adapted to the energy spectrum of the fission products that are most frequently produced. The person skilled in the art selects the number and type of detectors in accordance with those isotopes that are primarily expected to form in the interior of the fuel rods.

A disposal line 44 on the one hand connects the inlet of the detector device 191*b* to the outlet of the degassing device 171 and on the other hand connects the outlet of the detector device 191*b* to an outgoing-air duct of the nuclear power plant.

Before water samples from the fuel assemblies are tested, the configuration is purged with water that, although it originates from the same pool, is not removed beneath the hood that has already been fitted over a fuel assembly that is in the heat-up phase. At this time, therefore, only fission products that are already present in the extracted water and form a constant "radioactivity background" for the subsequent measurement are released in the extracted water. If a fuel assembly that is beneath the hood connected to the line 16 is now heated and the radioactivity recorded in the detector configuration rises, the rise is attributable to fission products escaping from the fuel assembly which is in the heat-up phase, and the measured values rise by the extent to which the discharge of fission gases increases. As a result, defects in the claddings of the fuel rods are detected at an early stage, and it is possible to start measuring further fuel assemblies at an early stage.

The invention is not restricted to boiling water fuel assemblies and positions in the reactor pressure vessel. Rather, the function of the fuel assembly channel of an assembly of this type may also be performed by other containers or, for example, by corresponding shafts of a storage rack for pressurized water fuel assemblies.

We claim:

1. A method for testing whether fuel rods of fuel assemblies resting on a working base and under water, of a nuclear reactor are leaking, which comprises the steps of:

fitting a common hood over all fuel assemblies of a first division of fuel assemblies, the first division containing at least a first group and a second group having in each case a plurality of the fuel assemblies, each of the first and second group including a first fuel assembly and a second fuel assembly;

heating all fuel assemblies of the first division of fuel assemblies by passing a filling gas under the hood, for driving radioactive fission products out of a defective fuel rod contained in the fuel assemblies of the first division;

subjecting the fuel assemblies belonging to the first group to a first common preliminary test and independently subjecting the second group to a second common preliminary test by continuously extracting samples of water and continuously degassing the water removed from an area around the fuel assemblies of the first division even during the heating resulting in gas;

continuously recording a radioactivity of gaseous fission products contained in the gas being continuously released;

carrying out the first common preliminary test by using a first device for extraction, a first device for degassing and a first device for recording the radioactivity in order to jointly test all the fuel assemblies belonging to the first group to determine if they are leaking;

carrying out the second common preliminary test by using a second device for extraction, a second device for degassing and a second device for recording the radioactivity in order to jointly test all the fuel assemblies belonging to the second group to determine if they are leaking;

performing an individual test of each of the fuel assemblies belonging to one of the first group and second group only if the first or second preliminary common test detects excessive radioactivity, carrying out the individual test using in each case a dedicated device for extraction, a dedicated device for degassing and a dedicated device for recording the radioactivity for each of the fuel assemblies, the dedicated device for extraction, the dedicated device for degassing and the dedicated device for recording the radioactivity provided for the individual test of the individual fuel assemblies already being in use for subjecting in each case the fuel assemblies belonging to one of the first and second group to the first and second common preliminary test; and heating the fuel assemblies belonging to a second division of fuel assemblies only if the first division of fuel assemblies has been tested.

2. The method according to claim 1, which comprises disposing of the gas which is continuously released after the radioactivity has been recorded, and recording the radioactivity in a detector configuration through which the gas is passed only a single time before being disposed of.

3. The method according to claim 2, wherein the degassing step comprises passing a carrier gas through the water that has been extracted, and passing the carrier gas through the detector configuration together with the gaseous fission products that have been released.

4. The method according to claim 1, which comprises heating the first fuel assembly belonging to the first division of fuel assemblies by at most a predetermined temperature difference beneath the hood which is fitted over the fuel assemblies belonging to the first division and providing the hood with a gas fill surrounding a top fitting of the first fuel assembly.

5. The method according to claim 4, which comprises passing a filling gas under the hood until a filling-level test line, leading out of the hood, indicates a predetermined height of a water level beneath the hood.

6. The method according to claim 1, wherein the common hood has transverse walls dividing the common hood into individual cells, and a filling-level test line, a height of which can be adjusted individually, leads outward from each of the individual cells, which comprises the step of:

passing a filling gas into all of the individual cells until the filling-level test lines contain the filling gas.

7. The method according to claim 1, which comprises controlling automatically the heating, testing and recording steps using a test program.

8. The method according to claim 1, which comprises performing the first and second common preliminary test on the first and second group simultaneously.

9. The method according to claim 1, which comprises performing the individual test of each of the fuel assemblies belonging to one of the first or second group simultaneously.

10. The method according to claim 1, which comprises heating the fuel assemblies belonging to the first group under a common hood by injecting a filling gas into individual cells formed above the fuel assemblies by side walls of the common hood, the common hood being common to all the fuel assemblies belonging to the first division, and the common hood only being lifted off the fuel assemblies when the fuel assemblies have completed testing.

11. The method according to claim 10, which comprises passing the filling gas into the individual cells until filling-level test lines which lead out of the cells indicate a predetermined height of a water level in the individual cells.

12. The method according to claim 11, which comprises height-adjusting the filling level test lines individually in the individual cells in accordance with a predetermined height of the water level in each of the individual cells, and the filling gas is introduced until the individual cells have each been vented by an associated one of the filling-level test lines.

13. An apparatus for testing fuel assemblies resting on a working base and under water, of a nuclear reactor, the apparatus comprising:
- a hood to be positioned above all fuel assemblies of a first division of fuel assemblies and having a downwardly facing opening formed therein, said downwardly facing opening able to be fitted over a top fitting of the fuel assemblies, the first division containing at least a first group and a second group having in each case a plurality of the fuel assemblies, each of the first and second group including a first fuel assembly and a second fuel assembly;
- a first device connected to and introducing a gas into said hood; and
- a plurality of second devices for continuously extracting water positioned under the gas introduced into said hood, said second devices being connected to extraction lines provided for each of the fuel assemblies of the first division, said second devices for extracting water is equal in number to a number of the fuel assemblies belonging to one of the groups of the fuel assemblies, at least some of said second devices to be switched from said extraction lines of the fuel assemblies belonging to one group to said extraction lines of the fuel assemblies belonging to another group and to a combination of said extraction lines belonging to one group;
- a plurality of third devices, each of said third devices connected to a respective one of said second devices and receiving the water previously extracted, said third devices continuously degassing the water resulting in a released gas;
- a plurality of fourth devices, each of said fourth devices connected to a respective one of said third devices and receiving the released gas for continuously recording a radioactivity of the released gas; and
- a control device connected to said second, third and fourth devices, said control device running a program for controlling said second, third and fourth devices.

14. The apparatus according to claim 13, including a disposal line connected to said third device for degassing, said fourth device for recording the radioactivity of the released gas is disposed in said disposal line connected to said third device for degassing and during the continuous extraction of the water said fourth device can only be connected to said third device through said disposal line.

15. The apparatus according to claim 13, wherein said third devices are connected to a line for introducing a carrier gas into the water.

16. The apparatus according to claim 13, wherein said hood has transverse walls dividing said hood into individual cells, and including dedicated, height-adjustable filling-level test lines, one of said dedicated, height adjustable filling-level test lines associated with each of said individual cells and said individual cells can be vented through said dedicated, height adjustable filling-level test lines.

17. The apparatus according to claim 16, including video cameras for observing said dedicated, height-adjustable filling-level test lines.

18. The apparatus according to claim 13, wherein said hood has transverse walls dividing said hood into individual cells each to be positioned above a top fitting of a group of the fuel assemblies, and each of said individual cells to be separately connected to said second devices for extraction and said third devices for degassing.

19. The apparatus according to claim 13, including:
- a vent line for each of the fuel assemblies disposed on a top fitting of the fuel assemblies; and
- an extraction line for each of the fuel assemblies disposed beneath said hood, said extraction line having a first end positioned in a predetermined position beneath said vent line, said extraction line leading out of said hood, on the top fitting of and over fuel rods of the fuel assemblies.

* * * * *